United States Patent [19]

Grögler et al.

[11] Patent Number: 4,569,982
[45] Date of Patent: Feb. 11, 1986

[54] PROCESS FOR THE PRODUCTION OF POLYUREA-ELASTOMERS AND CORRESPONDING ELASTOMERS HAVING AN IDEALIZED SEGMENT STRUCTURE

[75] Inventors: Gerhard Grögler; Heinrich Hess, both of Leverkusen; Richard Kopp; Werner Rasshofer, both of Cologne, all of Fed. Rep. of Germany

[73] Assignee: Bayer Aktiengesellschaft, Leverkusen, Fed. Rep. of Germany

[21] Appl. No.: 694,572

[22] Filed: Jan. 24, 1985

[30] Foreign Application Priority Data

Feb. 2, 1984 [DE] Fed. Rep. of Germany ....... 3403498

[51] Int. Cl.$^4$ ...................... C08G 18/79; C08G 18/32
[52] U.S. Cl. ........................................ 528/73; 528/44;
528/64; 528/67; 528/68
[58] Field of Search .................... 528/44, 67, 68, 64, 528/73

[56] References Cited

U.S. PATENT DOCUMENTS 4,336,365 6/1982 Reischl et al. ................... 528/67
4,400,497 8/1983 Blum et al. ..................... 528/902
4,418,160 11/1983 Rasshofer et al. ................ 528/68
4,442,280 4/1984 Grögler et al. ................... 528/54

Primary Examiner—Herbert S. Cockeram
Attorney, Agent, or Firm—Gene Harsh; Joseph C. Gil

[57] ABSTRACT

According to the present invention, relatively high molecular weight aliphatic and/or aromatic polyamines having molecular weights of from 400 to 8,000 (preferably from 600 to 4,000) are mixed with substantially equivalent quantities of low molecular weight, solid, finely-divided diisocyanates having a melting point of >40° C., (preferably >80° C.), such as phenylene diisocyanate, naphthlene-1,5-diisocyanate, dimeric toluylene-2,4-diisocyanate or the urea diisocyanate of toluylene-2,4-diisocyanate. This mixture, having a pot life of at least several minutes, is subsequently heated to a relatively high temperature, such as from 80° to 200° C.

The products obtained have excellent elastic properties over a broad temperature range. They have an exceptionally flat modulus of elasticity curve (G') in the torsional vibration test. The hard and soft segments are markedly segregated and are thus not substantially disturbed by reciprocal interaction causing "softening".

15 Claims, 2 Drawing Figures

PROCESS FOR THE PRODUCTION OF POLYUREA-ELASTOMERS AND CORRESPONDING ELASTOMERS HAVING AN IDEALIZED SEGMENT STRUCTURE

BACKGROUND OF THE INVENTION

Polyurethane elastomers have become a commerically significant group of organic polymer materials. They generally stand out due to the good strength thereof, the combination of good hardness with good elongation at break and the normally good resistance to wear.

An exceptionally large number of structural variations in combination with an equally large variety of properties is possible using diverse low molecular weight and high molecular weight reactants as starting materials.

The casting process is conventionally used to produce polyurethane-polyurea elastomers from reactive starting compounds. There are two possible procedures to this end, which are distinguishable by the order in which the reaction components are added.

In the one-shot process, the components are all mixed simultaneously according to gravimetric or volumetric metering and then poured into molds. The chemical reactions therefore start simultaneously, but differ somewhat due to the varying reactivity thereof (or by corresponding catalysis). The reactions are exothermic. Since it is impossible in the one-shot process to remove the heat in stages, additional complications may easily occur. Typical of the problems are a lack of homogeneity in the casting due to varying temperatures between the peripheral phase and the core, the formation of bubbles or cracks by overheating in the core, insufficient binding of the hard and soft segments by pronounced differences in the reactivity of the individual components, and intensified secondary reactions, such as the formation of isocyanurate and carbodiimide.

An ordered chemical structure of the soft and hard segments cannot be expected with the one-shot process. Soft segment units having a varied number of isocyanate-linked relatively high molecular weight reactants and hard segment units having a varied number of isocyanate-linked chain-lengthening agents are produced.

For this reason, the so-called "prepolymer technique", is used in commercial polyurethane resin systems.

In almost every case, the long-chain diol component (polyester, polyether) is partially or completely reacted with the diisocyanate. An OH— or NCO—terminated prepolymer is produced, depending on the equivalent ratio of the starting components. Oligomeric prepolymers having OH—end groups are generally unsuitable for casting processing due to the very high viscosity thereof, but do have limited use in urethane-rubbers. In comparison, many casting systems are based on prepolymers with most systems containing definite quantities of excess diisocyanates (semi-prepolymer, pre-adduct). This reaction product from the first reaction stage is either produced by the user himself, shortly before it is subsequently processed, or is delivered in this form by producers of raw materials. If this is the case, the product must have a storage stability of several months. Prepolymers obtained from exactly 2 mols of a diisocyanate and 1 mol of a long-chain diol are frequently used to cross-link bulky aromatic diamines. As opposed to semi-prepolymers, these prepolymers have the physiological advantage of not containing any volatile monomeric diisocyanates. This can be a concern from a health point of view when casting articles in open molds.

The NCO/OH ratio of the starting components is above 1 (up to about 1.15) in all casting systems. In other words several NCO groups have no OH functional material with which to react. These NCO groups react with the urethane groups which are formed and partially with atmospheric moisture causing chemical cross-linking.

The physical cross-linking (semi-crystalline hard segment association via the formation of hydrogen bonding) may be chemically completed by the formation of allophanate or biuret. In practice, chemical cross-linking takes place in the solid phase and is the reason why almost all glycol-cross-linked systems require subsequent annealing. This is necessary to achieve optimum properties in the material. Chemical and physical cross-linking together produce optimum material properties. In amine cross-linking systems, the hard segments segregate more rapidly due to the greater polarity of the urea groups. For this reason, amine-cross-linked products require a short period of subsequent heating. In amine-cross-linking, the processing temperature and the NCO-index has a qreater influence on the properties than in glycol-cross-linking.

Polyurethane/polyurea elastomers having an almost exact chemical structure of hard and soft segments may only be expected if prepolymers of 2 mols of a diisocyanate and 1 mol of a long-chain diol (polyether/polyester) are used and are reacted with 1 mol of a chain-lengthening agent (diol/aromatic diamine). In spite of the supposedly stoichiometric structure thereof, 2:1 NCO prepolymers of this type have a "Flory" distribution. In other words, they have corresponding quantities of NCO prepolymer molecules in which the long chain diols have been "preextended" by one or more diisocyanates, forming urethane bridges, as well as free diisocyanate molecules. If NCO prepolymer (mixtures) of this type are reacted with chain-lengthening agents, widened distributions of hard segments are again formed. Products of an unsatisfactory quality are obtained by this method with diols, so that diols among others, are reacted with so-called "semi-prepolymers", which contain a definite quantity of free diisocyanate in addition to the NCO prepolymer and thus enable a sufficient proportion of hard segments to be formed. If 2:1 prepolymers are used, aromatic diamines are preferably used as chain-lengthening agents or cross-linking agents.

The introduction and homogeneous distribution of the cross-linking agent into the prepolymer of a polyurethane casting system and the filling of the reaction composition into casting molds (which are almost always open and heated), must be done in two stages which directly follow each other since the available time (depending on the system) is at most only a few minutes and in some cases, is only a few seconds. The rapidly progressing reaction causes the viscosity to increase sharply and causes the composition to solidify quickly. The composition, in most cases, still requires subsequent heating to achieve its final physical properties.

In practice, the operations for stirring in the cross-linking agent and filling the molds are either carried out discontinuously in a manual process or else continuously-operating multi-component casting apparatus is used. It is also possible intermittently to process hot casting systems in conjunction with a shot-wise method for filling the mold.

The introduction and mixing of the cross-linking agent and the filling of the reaction composition into the casting mold is particularly troublesome when aromatic diamines are used, due to the inherent high reactivity thereof with respect to isocyanates. There have been many attempts to reduce the reactivity of the aromatic amines by appropriate modifications, such as by using amines substituted with bulky and/or extremely electron-withdrawing groups (German Offenlegungsschrift No. 3,012,864) or by using aromatic amine/salt complexes (U.S. Pat. No. 3,891,606). These processes suffer from disadvantages, e.g. the high cost of the aromatic diamines which are substituted by carboxylic acid ester or sulphonamide groups.

Processes are also known in which a finely-divided aromatic diamine is suspended in a polyhydroxyl compound and subsequently mixed with a polyisocyanate or an isocyanate group-containing prepolymer at a temperature below the melting point of the diamine. The composition may be cured at a temperature below the melting point of the diamine (German Offenlegungsschrift No. 2,635,400) or above the melting point of the diamine (German Auslegungsschrift No. 1,122,699). These so called "heterogeneous" processes (wherein diamines used as chain-lengthening agents may be reacted heterogeneously), permit longer processing times. However, doubts about the toxicity thereof still exist. Furthermore, the diamines are preferably used suspended in polyhydroxyl compounds so that a smooth-running reaction is difficult to achieve since the reaction velocities with respect to isocyanate groups differ markedly. Reaction injection molded elastomers on the basis of amine terminated polyethers are described in U.S. Pat. Nos. 4,444,910 and 4,443,067.

DESCRIPTION OF THE INVENTION

Figure 1:
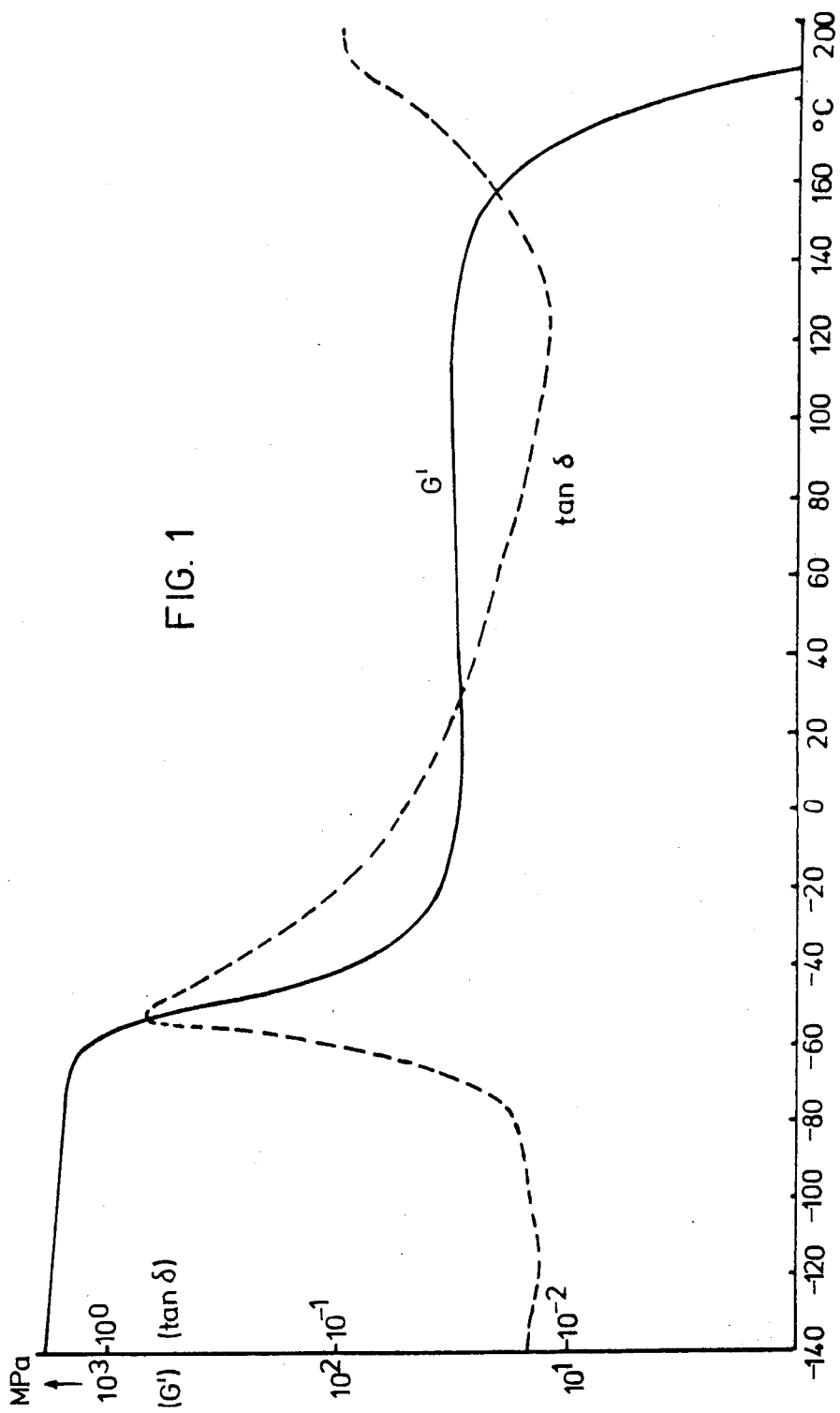
FIGS. 1 and 2 are torsional vibration curves for Compositions A and B of Example 1.

It has now surprisingly been found that these problems may be overcome and polyurea-elastomers having an almost ideal 1:1 hard and soft segment structure may be produced if low molecular weight, solid, finely-divided diisocyanates are reacted with relatively high molecular weight aromatic or aliphatic diamines in substantially equivalent amounts. The finely-divided polyisocyanates also permit a sufficient long pot life.

The ideal hard-soft segment distribution in segmented elastomers is described by R. Bonart in Angewandte Macromolekulare Chemie, 58/59 (1977), 259 (No. 849).

Thus, the present invention is directed to a process for the production of polyurea-elastomers having an almost ideal hard and soft segment structure, which process is characterized in that relatively high molecular weight aliphatic and/or aromatic polyamines having a molecular weight of from 400 to 8,000, preferably from 600 to 4,000, are mixed in substantially equivalent quantities with low molecular weight, solid, finely-divided diisocyanates having melting points of >40° C. (preferably diisocyanates having a rigid molecular structure and a melting point above 80° C.), pouring the mixtures into a mold, and heating the mixtures to relatively high temperatures, such as from 100° to 200° C., and preferably from 100° to 160° C. A further object of the present invention is to provide elastomers which are produced according to this process and have excellent elastic properties over a broad temperature range and which have an exceptionally flat modulus of elasticity curve (G') in the torsional vibration test. The hard and soft segments of the elastomers are markedly segregated. If diisocyanates having a rigid molecular structure and a high melting point are used, highly elastic products having good properties are directly produced from the relatively high molecular weight polyamines and the diisocyanates, even without the simultaneous use of chain-lengthening agents.

If aromatic diamines are simultaneously used as chain-lengthening agents, the elasticity and hardness and the softening behavior thereof may be further improved. Thus, the present invention is also directed to the simultaneous use of low molecular weight aromatic polyamines (preferably aromatic diamines) in addition to relatively high molecular weight polyamines.

The diisocyanates useful herein may be aliphatic, cycloaliphatic, araliphatic, aromatic and heterocyclic diisocyanates, with the aromatic diisocyanate preferred. Also useful are perchlorinated aryl diisocyanates: carbodiimide group-containing diisocyanates; allophanate group-containing diisocyanates; isocyanurate group-containing diisocyanates; urethane or urea group-containing diisocyanates; acylated urea group-containing diisocyanates: biuret group-containing diisocyanates: diisocyanates produced by telomerization reactions: and ester group-containing diisocyanates. Uretdione group-containing diisocyanates and urea group-containing diisocyanates are preferably used. It is also preferred to use diisocyanates having melting points above 80° C. and which have rigid molecular structure.

The following are examples of polyisocyanates which may be used:

| | Mp: |
|---|---|
| p-xylylene diisocyanate | 45–46° C. |
| p-tetramethyl-xylylene diisocyanate | 72° C. |
| 1,5-diisocyanatomethyl-naphthalene | 88–89° C. |
| 1,3-phenylene diisocyanate | 51° C. |
| 1,4-phenylene diisocyanate | 94–96° C. |
| 1-methyl-benzene-2,5-diisocyanate | 39° C. |
| 1,3-dimethyl-benzene-4,6-diisocyanate | 70–71° C. |
| 1,4-dimethyl-benzene-2,5-diisocyanate | 76° C. |
| 1-nitrobenzene-2,5-diisocyanate | 59–61° C. |
| 1,4-dichlorobenzene-2,5-diisocyanate | 139–137° C. |
| 1-methoxy-benzene-2,4-diisocyanate | 75° C. |
| 1-methoxy-benzene-2,5-diisocyanate | 89° C. |
| 1,3-dimethoxy-benzene-4,6-diisocyanate | 125° C. |
| azobenzene-4,4'-diisocyanate | 158–161° C. |
| diphenyl-ether-4,4'-diisocyanate | 66–68° C. |
| diphenyl-methane-4,4'-diisocyanate | 42° C. |
| diphenyl-dimethyl-methane-4,4'-diisocyanate | 92° C. |
| naphthalene-1,5-diisocyanate | 130–132° C. |
| 3,3'-dimethyl-biphenyl-4,4'-diisocyanate | 58–60° C. |
| diphenyl-disulphide-4,4'-diisocyanate | 58–60° C. |
| diphenyl-sulphone-4.4'-diisocyanate | 154° C. |
| 4,4'-diisocyanato-(1,2)-diphenyl-ethane | 88–90° C. |
| dimeric 1-methyl-2,4-phenylene diisocyanate | 156° C. |
| dimeric 1-isopropyl-2,4-phenylene diisocyanate | 125° C. |
| dimeric 1-chloro-2,4-phenylene diisocyanate | 177° C. |
| dimeric 2,4'-diisocyanato-diphenyl sulphide | 178–180° C. |
| dimeric diphenyl-methane-4,4'-diisocyanate | |
| 3,3'-diisocyanato-4,4'-dimethyl-N,N'—diphenyl urea | |
| N,N'—bis[4(4-isocyanatophenyl-methane)phenyl]urea | |
| N,N'—bis[4(2-isocyanatophenyl-methyl)phenyl]urea | |

| -continued | Mp: |
|---|---|
| According to the present invention, 1,5-naphthalene-diisocyanate, 3,3'-diisocyanato-4,4'-dimethyl-N,N'—diphenyl-urea, dimeric 1-methyl-2,4-diisocyanatobenzene, dimeric 4,4'-diisocyanato-diphenylmethane and 3,3'-dimethyl-diphenyl-4,4'- (or 2,2') diisocyanate are preferably used. Small quantities of triisocyanates, such as | |
| 1-methyl-benzene-2,4,6-triisocyanate | 75° C. |
| 1,3,5-trimethyl-benzene-2,4,6-triisocyanate or | 93° C. |
| triphenyl-methane-4,4'-4''-triisocyanate may also be used. | 89–90° C. |

According to the present invention the solid diisocyanates have an average particle size of $\leq 200$ μm, for example 1–200 μm. An average particle size of less than 30 μm and preferably 1 to 30 μm is most particularly preferred.

Polyamino compounds such as are produced by the hydrolysis (preferably alkaline hydrolysis) of suitable NCO-prepolymers which are based on relatively high molecular weight dihydroxyl compounds and excess aromatic diisocyanates, (in particular toluene-2,4-diisocyanate) are preferably used as relatively high molecular weight polyamino compounds (preferably diamino-compounds having aromatic amino groups) with molecular weights of from 400 to 8,000, preferably from 600 to 4,000. Examples of this process are given in German Offenlegungsschriften Nos. 2,948,419, 3,039,600 and 3,112,118; in European patent applications Ser. Nos. 61,627, 71,132, 71,139 and 97,869.

In the German Offenlegungsschrift No. 2,948,419, further prior art processes for producing aromatic amino compounds having a relatively high molecular weight structure are given, which are suitable according to the present invention. The processes according to German Offenlegungsschrift No. 2,948,419 and the other listed references relate to polyether amines, as well as polyester, polyacetal, polythioether or polycaprolactone polyamines, preferably di- or tri-functional polyamines, which contain urethane groups (from reacting suitable relatively high molecular weight polyhydroxyl compounds with the excess polyisocyanates). The relatively high molecular weight diamines may also be produced according to other processes, such as by reacting NCO prepolymers with excess quantities of hydrazine, aminophenylethylamine or other diamines in accordance with German Auslegungsschrift No. 1,694,152. A further process, described in French Pat. No. 1,415,317, is by converting the NCO prepolymers into N-formyl derivatives using formic acid and saponifying them. Reacting NCO prepolymers with sulphaminic acid in accordance with German Auslegungsschrift No. 1,155,907 also produces high molecular weight polyamines. Relatively high molecular weight polyamino compounds which are bound to aliphatic radicals (via aliphatic polyisocyanates) may also be produced in addition to amino groups which are bound to aromatic radicals (from aromatic polyisocyanates).

Relatively high molecular weight aliphatic diamines may also be used, such as are obtained, for example, by the reductive amination of polyoxyalkylene glycols with ammonia, as described in Belgian Pat. No. 634,741 or U.S. Pat. No. 3,654,370. Further relatively high molecular weight polyoxyalkylene polyamines may be produced according to methods, such as are listed in the publication "Jeffamine, Polyoxypropylene Amines" by Texaco Chemical Co., 1978; by hydrogenating cyanethylated polyoxypropylene glycols (German Offenlegungsschrift No. 1,193,671); by aminating polypropylene glycol sulphonic acid esters (U.S. Pat. No. 3,236,895); by treating a polyoxyalkylene glycol with epichlorohydrin and a primary amine (French Pat. No. 1,466,708); or by reacting NCO prepolymers with hydroxyl group-containing enamines, aldimines or ketimines and subsequent hydrolysis in accordance with German Auslegungsschrift No. 2,546,536. Suitable relatively high molecular weight aliphatic diamines are also the polyamines which are obtained in accordance with German Offenlegungsschriften 2,948,419 and 3,039,600 by the alkaline hydrolysis of NCO prepolymers (with aliphatic diisocyanates).

These relatively high molecular weight polyamines have a molecular weight of from about 400 to 8,000, preferably from 600 to 4,000, most preferably from 1,000 to 3,000.

Depending on the production thereof (for example, from aromatic NCO prepolymers by alkaline hydrolysis), the relatively high molecular weight polyamines may contain urethane groups, so that, according to the present invention, the elastomers produced therefrom may contain urethane groups.

According to the present invention, small amounts (preferably <5 mol percent of the difunctional amines) of tri- and higher functional relatively high molecular weight polyamines may be used to produce the polyurea-elastomers, which polyamines are obtainable by the same process as the diamines.

Furthermore, the relatively high molecular weight polyamines may be linked to subequivalent quantities of diisocyanates, preferably toluene diisocyanate, to produce longer-chain, relatively high molecular weight polyamines.

In general, it is unnecessary to catalyze the reaction due to the high reactivity of the aromatic and aliphatic relatively high molecular weight polyamine with respect to isocyanates.

Low molecular weight aromatic diamines in the molecular weight range of from 108 to 399 may be used in addition to the relatively high molecular weight polyamines. The term "aromatic diamines" should also be understood as representing amines which contain the amino group bound to heterocyclic radicals having an aromatic character. The following are examples of suitable aromatic diamines: p-phenylene diamine; 2,4-/2,6-toluylene diamines; diphenyl-methane-4,4'- and/or -2,4'- and/or -2,2'-diamines; 3,3 -dichloro-4,4'-diaminodiphenylmethanes; 3-($C_1$–$C_8$)alkyl-4,4'-diaminodiphenylmethanes; the 3,3'-di-($C_1$–$C_4$)alkyl-4,4'-diaminodiphenyl-methanes; the 3,3',5,5'-tetra-($C_1$–$C_4$)-alkyl-4,4'-diphenyl-methanes; the 4,4'-diaminodiphenyl-sulphides, -sulphoxides or -sulphones; ether group-containing diamines as described in German Auslegungsschriften No. 1,770,525 and 1,809,172 (U.S. Pat. Nos. 3,654,364 and 3,736,295); 2-halogen-1,3-phenylene diamines which may be substituted at the 5-position (German Auslegungsschriften Nos. 2,001,772; 2,025,896 and 2,065,869); bis-anthranilic acid esters (German Auslegungsschriften Nos. 2,042,644 and 2,160,590); 2,4-diamino benzoic acid esters according to German Auslegungsschrift No. 2,025,900; and toluene diamines which have been substituted by one, two or three ($C_1$–$C_4$) alkyl groups. The quantity of low molecular weight diamines is from 0.05 to 5.0 mols, preferably from 0.1 to 1.5 mols, per mol of relatively high molecular weight diamine. 3,5-diethyl-2,4-/2,6-toluylene diamines are particularly preferred.

Other materials may also be used in preparing the elastomers of the present invention.

The following are examples of auxiliaries and additives which may be used: dyes or pigments; fillers, such as silica gel, gypsum, talcum, active carbon and metal powder; UV-absorption agents, or stabilizers, such as phenolic antioxidants; light-protecting agents; blowing agents; plasticizers, surface active additives, such as emulsifiers or foam stabilizers; cell regulators; anti-blocking agents; silicones; flameproofing agents; and fungistatically-and/or bacterio-statically-acting substances.

Inorganic and/or organic, fibrous reinforcing materials may, for example, be used as fillers. Examples include glass fibers, (preferably from 2 to 60 mm in length), graphite fibers, asbestos fibers, and fiber materials based on organic polymers, such as a polyester (such as polyethylene terephthalate), or aromatic polyamines (such as the m-phenylene/isophthalic acid polyamide or poly-p-phenylene-terephthalamide), or even polycaprolactam. These fiber materials may be in the form of mats, tows, continuous fibers, non-woven fabrics or a random staple fiber mixture. Glass fibers which are provided with sizes to give the fibers an affinity to polyurethanes are preferred. The quantity of filler to be incorporated depends on the improvement in the mechanical properties which is desired, and in general from 5 to 60%, by weight, of fiber material can be used.

The ratio of NCO equivalents of the finely-divided, solid di- or polyisocyanate to the $NH_2$-equivalents of the relatively high molecular weight di- or polyamines and optionally low molecular weight aromatic diamines is from 0.8 to 1.5:1, an $NCO/NH_2$-equivalent ratio of from 0.95 to 1.35:1 being preferred and a ratio of from 1:1 to 1.25:1 being particularly preferred. Products having the highest molecular weight are generally obtained when there is an NCO/OH ratio of about 1 or slightly above.

To carry out the process according to the present invention, the finely-divided, solid diisocyanate is firstly manually mixed, or mixed using a suitable mixing apparatus, with the relatively high molecular weight polyamine or a mixture thereof having further relatively high molecular weight di- and/or polyamines and/or low molecular weight aromatic diamines. Depending on the type of component which is used, the processing time (so-called pot life) of these mixtures is from several minutes to several hours.

If bubble-free elastomer parts are to be obtained, the isocyanate/amine mixture is degassed with stirring under vacuum, if it is still capable of being stirred. The mixture is then poured into a suitable mold and is baked in the mold, which may be directly heated or placed in a conventional heating chamber. The mixture is in most cases baked at a temperature of from 80° to 200° C. Preferred is a baking temperature of from 100° to 160° C., and most preferred from 120° to 130° C.

A series of experiments will disclose the optimum duration of baking and baking temperature. Depending on the baking temperature, the duration is from several minutes to about 8 hours.

According to the present invention, high quality elastomers are obtained which are substantially linear in structure and have high thermo-mechanical stability. The thermo-mechanical stability of a segmented polyurethane is higher, (a) the higher the softening and melting region of the hard phase and (b) the more complete the separation of the hard segment component from the soft segment matrix. As a result, the range of the rubber elastic stage is more pronounced, (c) the more exactly the conditions according to (a) and (b) are met and the lower is the glass transition temperature Tg of the soft segment phase.

Particular attention should be paid to the torsional vibration curves which are measured (see diagrams 1 and 2 in Example 1). They give information about the separation of the hard segment phase and the soft segment phase. The diagrams indicate a mixture having complete phase separation, that is there is a very wide region of rubber elasticity.

The invention is further illustrated, but is not intended to be limited by the following examples in which all parts and percentages are by weight unless otherwise specified.

EXAMPLES

EXAMPLE 1

This example illustrates the production of elastomers from a relatively high molecular weight polyether diamine having aromatic amino groups and various solid diisocyanates. Naphthalene-1,5-diisocyanate (NDI), dimeric toluylene-2,4-diisocyanate (TT) or the urea diisocyanate of 2,4-TDI (so-called 3,3'-diisocyanato-4,4'-dimethyl-N,N'-diphenylurea) (TDIH) are used.

Production of the Relatively High Molecular Weight, Aromatic Polyamine 1 mol of a linear polypropylene ether glycol having an OH number of 56 and 2 mols of toluene-2,4-diisocyanate are converted into an NCO prepolymer (3.58% of NCO) by heating at 80° C. for 4 hours. 810 g of the NCO prepolymer which has been heated to 45° C. are introduced with intensive stirring into a cold solution of 52.2 g of potassium hydroxide and 500 ml of water and 300 ml of acetone (NCO:OH$^\ominus$ ratio 1:1.35), such that an internal temperature of 25° C. is not exceeded. The mixture is then stirred at this temperature for a further 30 minutes and then heated to reflux for two hours. After being allowed to stand for 30 minutes, the lower aqueous salt solution is separated from the 2-phase reaction mixture and discarded. The upper phase is freed from water and acetone residue at 20 mbars/80° C. and then at 1 mbar/100° C. Small residual quantities of salt are separated by passing the produce heated to 60° C. through a pressurized suction filter (3 bars excess pressure) and the polyether amine having an NH number of 48.4 is isolated.

Reaction According to the Present Invention 100 parts of the relatively high molecular weight aromatic polyamine are intensively mixed with the corresponding quantity of the finely-divided diisocyanate (as shown in Table 1), immediately thereafter degassed under a water jet vacuum, poured into a cold open mold which is about 20 cm×20 cm×0.5 cm in dimension and baked in a heating chamber at 120° C. for 4 hours. Table 1 shows the mechanical values of the elastomers which are obtained and FIG. 1 and FIG. 2 show the torsional vibration curves for products B and C.

FIG. 1 shows the curves of the modulus of transverse elasticity (G') (between 10 and 10,000 MPa) and the damping (tang δ) for temperatures between −160° and +200° C. from the torsional vibration experiment in accordance with DIN 53 445. The length of the samples is 50.00 mm, the width of the samples is 8.0 mm and the thickness of the samples is 1.48 mm. Density=1070 kg/m$^3$.

Figure 2:
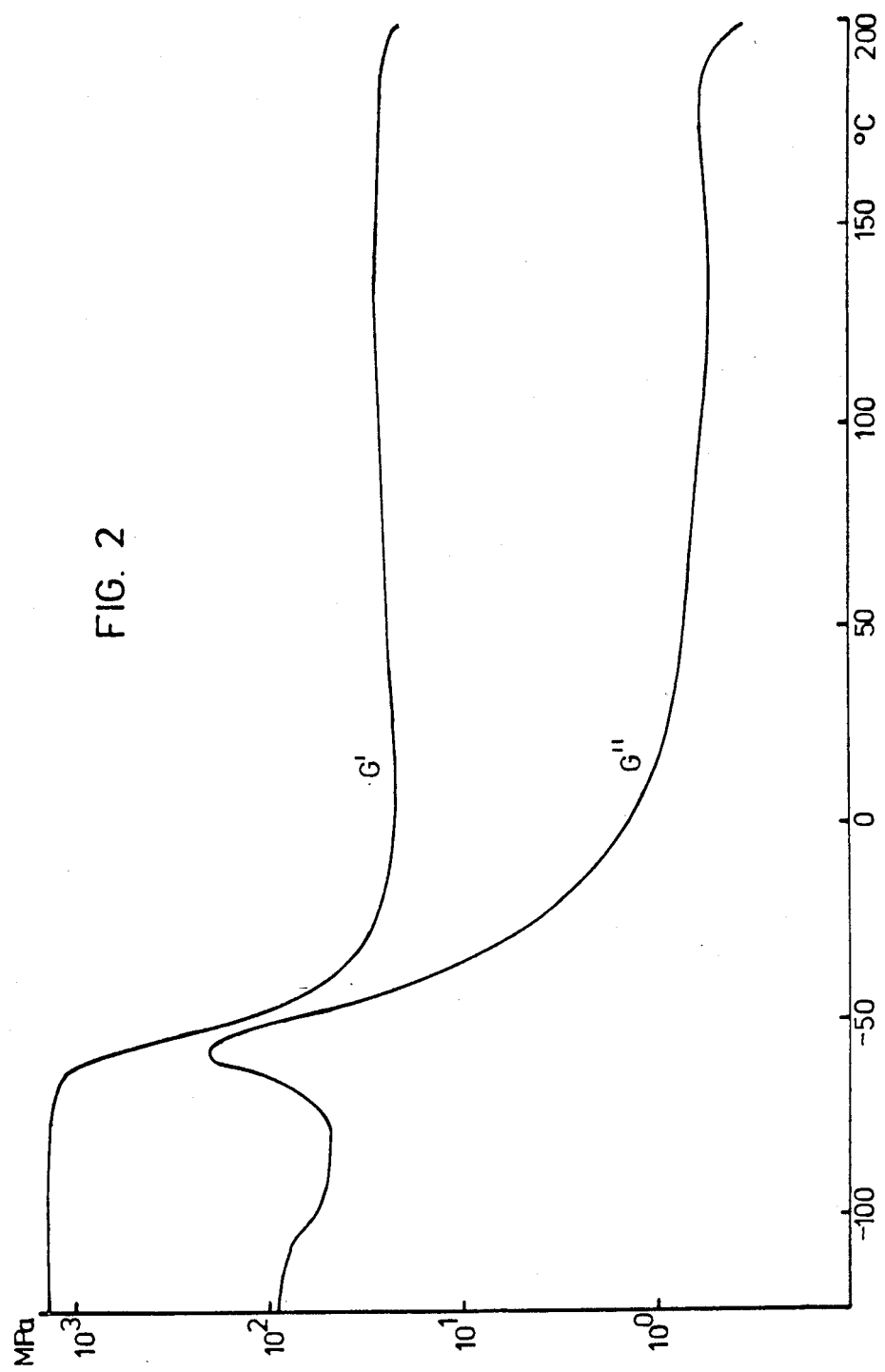

In FIG. 2, the curves of the modulus of transverse elasticity (G') and the modulus of loss (G''), are given in MPa for temperatures of from −120° to 200° C. from the torsional vibration experiment. The size of the sample is 4.00 mm×6.0 mm; (1 Hz; temperature sweep strain: 0.5%).

The torsional vibration experiments produce an exceptionally parallel graph for the modulus of transverse elasticity (G') at from −20° to +140° C. (FIG. 1) or from −20° to +185° C. (FIG. 2), thereby indicating an ideal distribution of the soft and hard segments in the elastomer without reciprocal action. The graph of the modulus of transverse elasticity G' is much more favorable than that of polyurethanes which are based on relatively high molecular weight polyols and diol chain-lengthening agents (see Ullmans Encylopadie der Technischen Chemie, Verlag Chemie, D 6940 Weinheim (1981), Vol. 19, page 331, FIG. 33).

EXAMPLE 2

100 parts of the aliphatic amino polyether Jeffamine D-2000, difunctional polyamine, molecular weight 2000, (Texaco Chemical Corporation) are intensively mixed at room temperature with 20.55 parts of the diisocyanate (TDIH) (25.8% of NCO) at an NCO/NH$_2$ ratio of 1.25. The processing time is at least 10 minutes at room temperature. The elastomer control plate is produoed as in Example 1 and baked for 4 hours at 120° C.; for results, see Table 1.

EXAMPLE 3

Production of the Relatively High Molecular Weight Polyester Amine

A mixture of 5550 ml of dimethyl formamide, 925 ml of water and 370 ml of trimethyl amine which has been heated to 90° is used as a starting solution. 3.7 kg of an NCO prepolymer having an NCO content of 3.4% are added with intensive stirring, producing a vigorous evaluation of gas. This NCO prepolymer was produced by heating a mixture of 2,4-toluene diisocyanate and a polyester having an OH number of 56 (from adipic acid, ethylene glycol and butane diol-1,4 (1:1)) for 3 hours in an NCO/OH equivalent ratio of 2:1. The reaction mixture is subsequently stirred for 10 minutes and then the volatile constituents are distilled off, first at 80° C./18 mbars and then at 80° C./0.13 mbars. The remaining, highly viscous product has an NH number of 34.45 (mgKOH/g).

Reaction According to the Present Invention 100 parts of the relatively high molecular weight polyester diamine are intensively mixed with 17 parts of the diisocyanate TDIH (25.8% of NCO); NCO/NH$_2$-ratio=1,25:1. The processing time is about 5 minutes at room temperature. The elastomer control plate is produced as in Example 1. For results, see Table 1.

EXAMPLE 4

36 parts of TT (NCO/NH$_2$ ratio of 1.1:1) are stirred into a mixture of 100 parts of an aromatic amino polyether according to Example 1 and 10 parts of a mixture of 65% of 3,5-diethyl-toluylene diamine-2,4 and 35% of 3,5-diethyl-toluylene diamine-2,6.

The dispersion is degassed for a short period of time under an oil pump vacuum with stirring and processed to produce a control plate according to Example 1 (treated 4 hours at 120° C.)(for mechanical values see Table 1).

TABLE 1

| Example No. | Test | Diisocyanate | Quantity | (NCO:NH$_2$) ratio | Pot Life (casting time) (min) | 100% Modulus[1] (Mpa) | Resistance to tearing[1] (MPa) | Elongation at tear[1] (MPa) |
|---|---|---|---|---|---|---|---|---|
| 1 | A | NDI | 12 g | 1.32 | 5 (25° C.) 8 (14° C.) | 7.8 | 10.8 | 350 |
| 1 | B | TT | 16.6 g | 1.10 | 30 (25° C.) | 11.4 | 18 | 700 |
| 1 | C | TDIH | 17.6 g | 1.25 | 30 (25° C.) | 11.8 | 16.3 | 400 |
| 2 | — | TDIH | 20.55 g | 1.25 | 10 | 7.5 | 10.5 | 600 |
| 3 | — | TDIH | 17.0 g | | 5 | 11.3 | 38.5 | 550 |
| 4 | | TT | 36.0 g | 1.10 | not tested | — | 20.0 | 300 |

| Example No. | Resistance to tear propagation[2] (kN/m) | Surface hardness (Shore A)[3] | Surface hardness (Shore D) | Elasticity[4] (%) |
|---|---|---|---|---|
| 1 | 42 | 92 | 39 | 50 |
| 1 | 46 | 94 | 39 | 58 |
| 1 | 40.2 | 92 | 40 | 51 |
| 2 | 30 | 91 | 37 | 60 |
| 3 | 68.5 | 92 | 40 | 48 |
| 4 | 68 | — | 58 | 50 |

[1]Tensile test according to DIN 53 504
[2]DIN 53 515
[3]DIN 53 505
[4]DIN 53 512

EXAMPLE 5

(Comparative Example)

100 parts of a difunctional hydroxyl polyether having an OH number of 56 and a molecular weight of 2000 (which has been produced by addition of propylene oxide to propane diol-1,2) are intensively mixed with the given quantity of diisocyanate in each case and subsequently degassed for about 5 minutes under an oil pump vacuum with stirring.

Table 2 shows the results which were obtained even after a relatively long period of baking, the mixtures do not produce elastomers having good properties, but only produce soft compositions.

TABLE 2

| Test | Diisocyanate | Quantity | Appearance 4h/120° C. | after 16h/120° C. | NCO/OH ratio |
|---|---|---|---|---|---|
| A | NDI | 11.50 | liquid | pasty | 1.1 |
| B | TT | 19.10 | liquid | pasty | 1.1 |
| C | TDIH | 17.90 | liquid | tacky, non-elastic molding | 1.1 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurea elastomer having an approximately 1:1 hard and soft segment structure comprising;
  (a) mixing,
    (1) an aliphatic and/or aromatic polyamine having a molecular weight of from 400 to 8000 with substantially equivalent amounts of,
    (2) a low molecular weight, solid finely-divided diisocyanate having a melting point greater than 40° C.,
  (b) pouring the mix produced in (a) into a mold and;
  (c) heating the mix in the mold.

2. The process of claim 1 in which heating step (c) is carried out at a temperature of from 80° to 200° C.

3. The process of claim 1 in which heating step (c) is carried out at a temperature of from 100° to 160° C.

4. The process of claim 1 in which the polyamine of step (a)(1) is an aromatic polyamine having a molecular weight of from 600 to 4000.

5. The process of claim 4 in which the aromatic polyamine has been produced by alkaline hydrolysis of NCO prepolymers of polyether and/or polyester diols and an excess of aromatic diisocyanate.

6. The process of claim 5 in which the aromatic diisocyanate is 2,4-toluylene diisocyanate.

7. The process of claim 1 in which an aromatic diamine chain-lengthening agent having a molecular weight of from 108 to 399 is included in the materials mixed in step (a).

8. The process of claim 7 in which the diamine chain-lengthening agent is used in a quantity of from 0.05 to 5 mols for each mol of polyamine having a molecular weight of from 400 to 8000 present.

9. The process of claim 1 in which the solid finely-divided diisocyanate has a melting point greater than 80° C. and a symmetrical structure.

10. The process of claim 1 in which the solid finely-divided diisocyanate is selected from the group consisting of 1,5-naphthalene diisocyanate, 3,3'-diisocyanato-4,4'-dimethyl-N,N'-diphenylurea, dimeric 1-methyl-2,4-diisocyanatobenzene, dimeric 4,4'-diisocyanato-diphenylmethane, 3,3'-dimethyl-biphenyl-4,4'-diisocyanate, 3,3'-dimethyl-biphenyl-2,2'-diisocyanate and mixtures thereof.

11. The process of claim 1 in which the materials mixed in step (a) are present in quantities such that from 0.8 to 1.5 equivalents of isocyanate are present for equivalent of amine.

12. The process of claim 11 in which the materials mixed in step (a) are present in quantities such that from 0.95 to 1.35 equivalents of isocyanate are present for equivalent of amine.

13. The process of claim 1, in which the solid diisocyanates have a particle size of 1 to 200 μm.

14. A polyurea elastomer having an approximately 1:1 hard and soft segment structure produced by heating a mixture comprising:
  (1) an aliphatic and/or aromatic polyamine having a molecular weight of from 400 to 8,000,
  (2) a low molecular weight, solid finely-divided diisocyanate having a melting point greater than 40° C. and optionally,
  (3) an aromatic diamine chain-lengthening agent having a molecular weight of from 108 to 399
in which mixture from 0.8 to 1.5 equivalents of isocyanate are present for each equivalent of amine, to a temperature of from 80° to 200° C.

15. The elastomer of claim 14 in which the solid finely-divided diisocyanate (2) is selected from the group consisting of 1,5-naphthalene diisocyanate, 3,3'-diisocyanato-4,4'-dimethyl-N,N'-diphenyl urea, dimeric 1-methyl-2,4-diisocyanato benzene, dimeric 4,4'-diisocyanato-diphenylmethane, 3,3'-dimethyl-biphenyl-4,4'-diisocyanate, 3,3'-dimethyl-biphenyl-2,2'-diisocyanate and mixtures thereof.

* * * * *